United States Patent [19]

Lundeen

[11] Patent Number: 4,771,888

[45] Date of Patent: Sep. 20, 1988

[54] CASSETTE DISPLAY AND HOLDER

[76] Inventor: Duane C. Lundeen, 431 S. Taylor, Oak Park, Ill. 60302

[21] Appl. No.: 20,383

[22] Filed: Mar. 2, 1987

[51] Int. Cl.$^4$ .......................................... B65D 85/672
[52] U.S. Cl. .................................. 206/387; 206/459; 206/493
[58] Field of Search ............... 206/387, 461, 469–471, 206/807, 493, 459

[56] References Cited

U.S. PATENT DOCUMENTS

| 4,119,200 | 10/1978 | Cassidy et al. | 206/387 |
| 4,375,850 | 3/1983 | Smyth et al. | 206/387 |
| 4,433,780 | 2/1984 | Ellis | 206/387 |
| 4,623,062 | 11/1986 | Chase et al. | 206/807 |
| 4,651,876 | 3/1987 | Tanuma et al. | 206/387 |

FOREIGN PATENT DOCUMENTS

| 2156570 | 6/1972 | Fed. Rep. of Germany | 206/461 |
| 3202204 | 8/1983 | Fed. Rep. of Germany | 206/387 |
| 2016419 | 9/1979 | United Kingdom | 206/387 |

Primary Examiner—Jimmy G. Foster

[57] ABSTRACT

A standard cassette display and storage holder consisting of a rigid back panel with a cassette holding area and a separate larger graphics area. The panel has a flange that carries cassette identification information and it also seals the open part of the cassette.

8 Claims, 3 Drawing Sheets

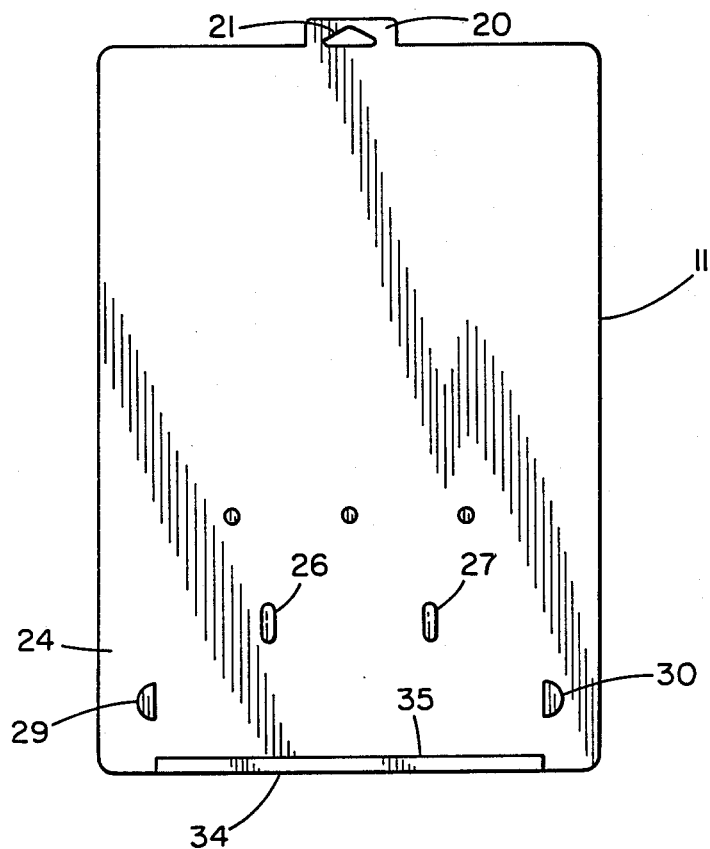
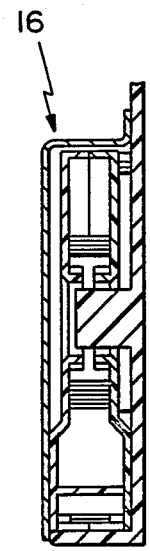
FIG.6  FIG.7
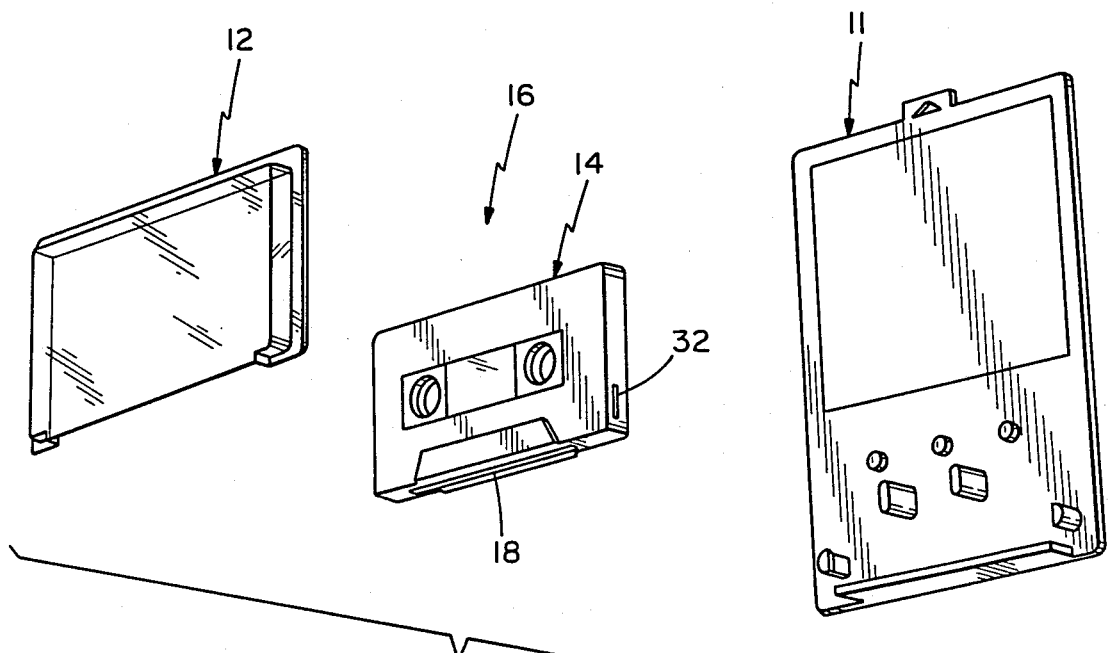
FIG.8

CASSETTE DISPLAY AND HOLDER

BACKGROUND OF THE INVENTION

Audio tape cassettes are to a large extent today marketed and packaged in a two part box-like container that is slightly larger than the cassette itself that carries, in addition to the cassette, a cardboard insert having graphics and cassette information, that can be viewed through a clear plastic portion of the container. This container includes a pouch-like portion into which the tape and graphics card are inserted and a pivotal cover that encloses the open area of the pouch when snapped over. Norelco Corporation manufactures a container of this type.

The Norelco type container is additionally overpackaged in a variety of ways for display at the retail location. Such repackaging or over-packaging ranges from a simple thin-skinned plastic shrink wrap to more elaborate display cards with blister-type packaging.

A container of this two-part type is shown in the Smyth, et al., U.S. Pat. No. 4,375,850, where it is illustrated enclosed within a generally planar blister pack having a hole for insertion over a display rack and also having side edges that permit it to be inserted into a grooved display storage device. After the packaged cassette is purchased, the blister, of course, must be destroyed in order to remove the "Norelco" type container and, therefore, the storage capability for the user is rendered useless. Furthermore, the cost of this blister-type packaging of the "Norelco" type container is greater than the simple shrink wrap referred to above.

Attempts have been made in the past to provide consumer useable storage devices for cassette type tapes. One is shown in the Brown, U.S. Pat. No. 3,917,067, that includes a planar card having a plurality of flexible rubber projections that fit within the reels of the cassette to hold the cassette in position. This storage card is utilized solely as a user convenience and is not designed to display the cassette at the point of purchase.

Other consumer useable multiple tape storage devices have been designed in the past, such as the one shown in the Tolerson U.S. Pat. No. 4,180,299.

Because the point of sale packaging and marketing of audio cassettes, and particularly pre-recorded cassettes, utilize individually packaged cassettes, and since the cassettes are only approximately 3 in. $\times$ 4 in. $\times \frac{1}{2}$ in., they are easily stolen from the retail marketplace, and this theft is of such high magnitude that it is a significant cost problem in the audio cassette industry. This problem is so significant that many retailers only display pre-recorded audio cassettes through glass or plastic enclosed permanent shelving. This mode of marketing prevents the consumer from physically handling the product and from readily reading any informative text on the cassette package, and this results in reduced sales volume.

It is a primary object of the present invention to ameliorate the problems noted above in the packaging and consumer storage of cassette tapes, and particularly, standard audio tape cassettes.

SUMMARY OF THE PRESENT INVENTION

In accordance with the present invention, a standard cassette display and storage holder is provided that attractively displays audio cassettes in a substantially theft-free manner at the retail location and also provides the consumer after purchase with a permanent storage device for his cassette.

Toward this end, the present cassette display and storage holder includes a rigid back panel with a cassette holding area and a separate and larger graphics area. The panel has a flange along its bottom edge that carries cassette identification information, and it also seals the exposed tape part of the cassette to prevent the entry of dust and foreign matter that might damage the tape or the reel mechanisms.

The rigid back panel and cassette can be over-packaged for marketing either with thin film shrink wrap or it may be blister packaged.

The rigid back panel is approximately one-half the size of an LP phono record package so that they can be displayed in two rows in the same display racks presently used for phono record display. The large back panel makes it practically impossible for the packaged cassette to be stolen from the retail location. It also serves the very important function of providing a very large graphics and information area on the back panel that not only eliminates the present requirement for graphics and information insert cards in the cassette containers but also provides a greater graphics area than is presently provided.

After purchase the consumer continues to utilize the display and storage holder to permanently store the cassette either in a parallel groove storage device or they can be simply stacked on any shelf. In either case after stacking or storing in multiple slotted storage devices, only the end of the storage holder is visible, i.e., the flanged end, and this flange contains identification information on its outside surface relating to that cassette so the user does not have to separate one cassette from the other to find the tape he or she is looking for.

Other objects and advantages will appear from the following detailed description of the invention.

BRIEF DESCRIPTION OF THE DRAWINGS

FIG. 6 is a front sub-assembly view of the back panel of the present display and storage holder;

FIG. 7 is a fragmentary section of the display and storage holder and cassette taken generally along line 7—7 of FIG. 2;

FIG. 8 is an exploded view of the present cassette display and storage holder;

DETAILED DESCRIPTION OF THE PREFERRED EMBODIMENTS

Figure 1:
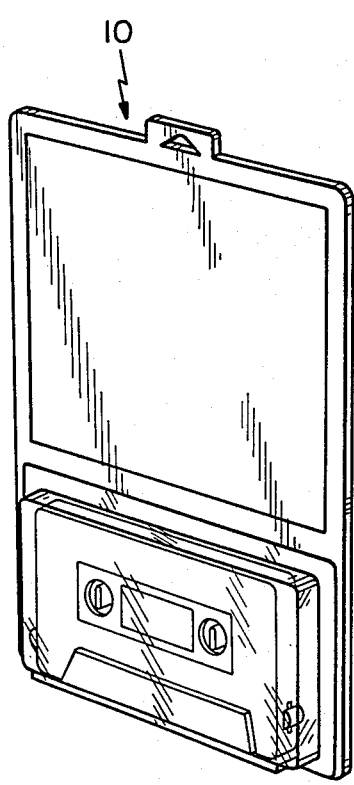
FIG. 1 is a perspective view of the present cassette display and storage holder.

Referring to the drawings and particularly FIGS. 1 to 8, the present audio cassette display and storage holder 10 is seen to generally include a rigid back panel 11 having a plurality of integral cassette engaging projections extending uni-directionally therefrom, and a blister cover 12 adapted to seal and enclose a standard audio cassette 14 against back panel 11.

The cassettes 14 are standard cassettes having dimensions approximately 4 in. ×2½ in. ×15/32 in. with tape winding reels 16 and 17 and a tape exposed open area 18 where the reading head has access directly to the contained tape.

Figure 10:
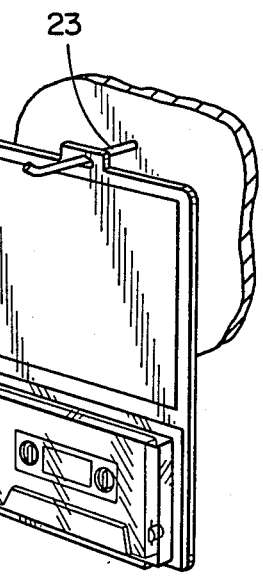
FIG. 10 is a perspective view of the present cassette display and storage holder on a rod-type retail display; and, FIG. 11 is a consumer type slotted storage device for multiple cassette display and storage holders according to the present invention.

The rigid back panel 11 is 7½ in. ×5¼ in. and approximately 0.070 inches in thickness. It is constructed of a one piece plastic molding of an impact resistant plastic such as polypropylene or "Delrin" or many other thermoplastics that have similar properties. As seen more clearly in FIG. 5 the back panel 11 has an upper coplanar tab 20 with an aperture 21 therein to receive a retail display rod 23 as illustrated in FIG. 10, to accommodate one mode of retail display.

Figure 2:
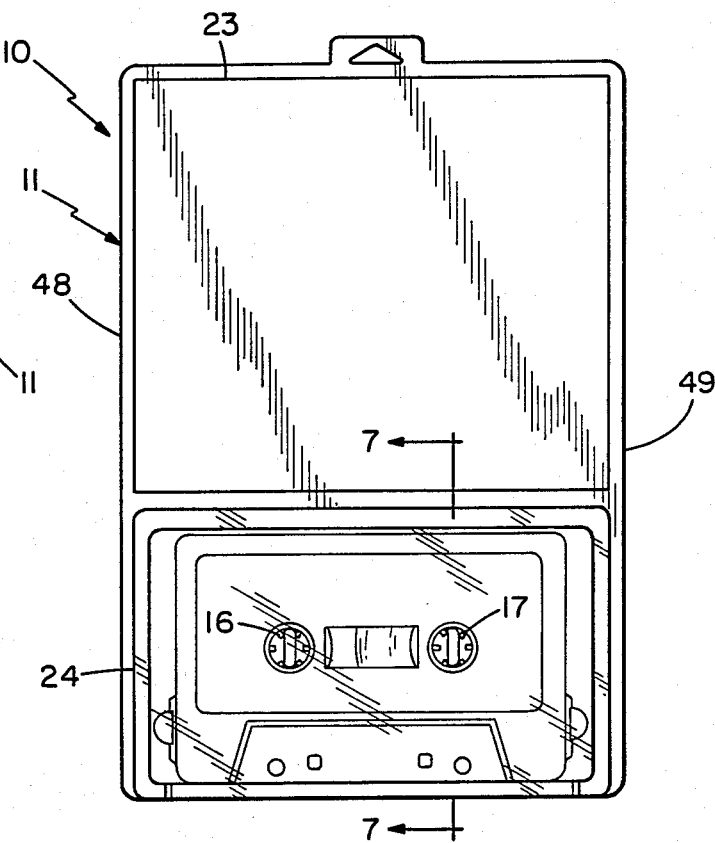
FIG. 2 is an enlarged front view of the cassette display and storage holder illustrated in FIG. 1.
Figure 3:
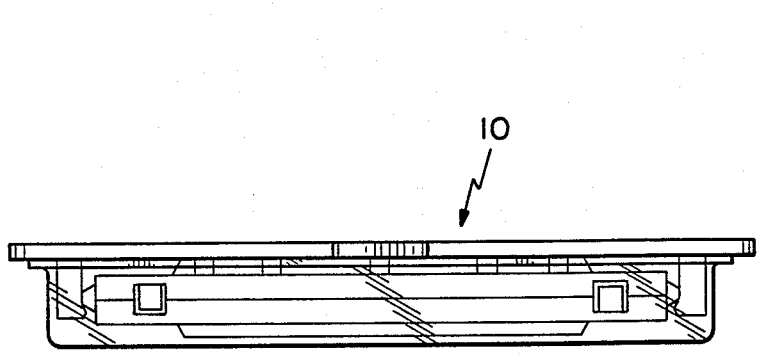
FIG. 3 is a top view of the cassette display and storage holder illustrated in FIG. 1.
Figure 4:
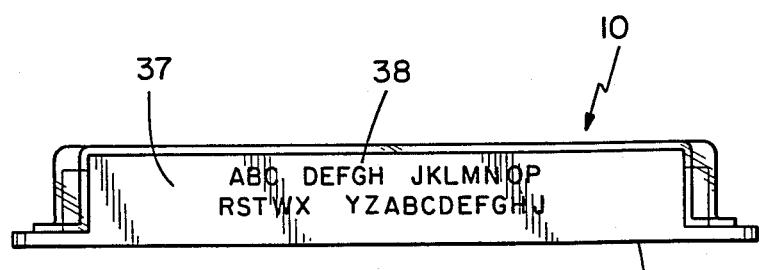
FIG. 4 is a bottom view of the display and storage holder illustrated in FIGS. 1 to 3.
Figure 5:
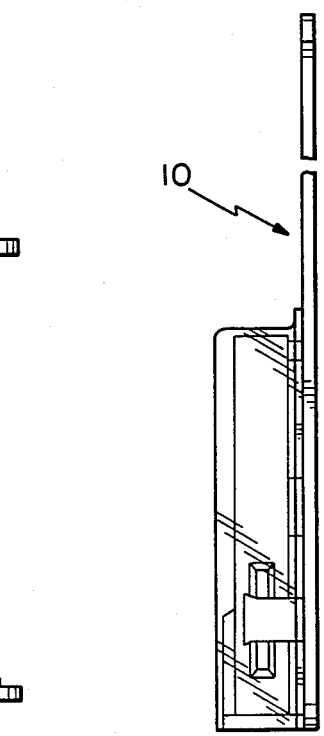
FIG. 5 is a right side view, partly fragmented, of the display and storage holder illustrated in FIGS. 1 to 4.
Figure 9:
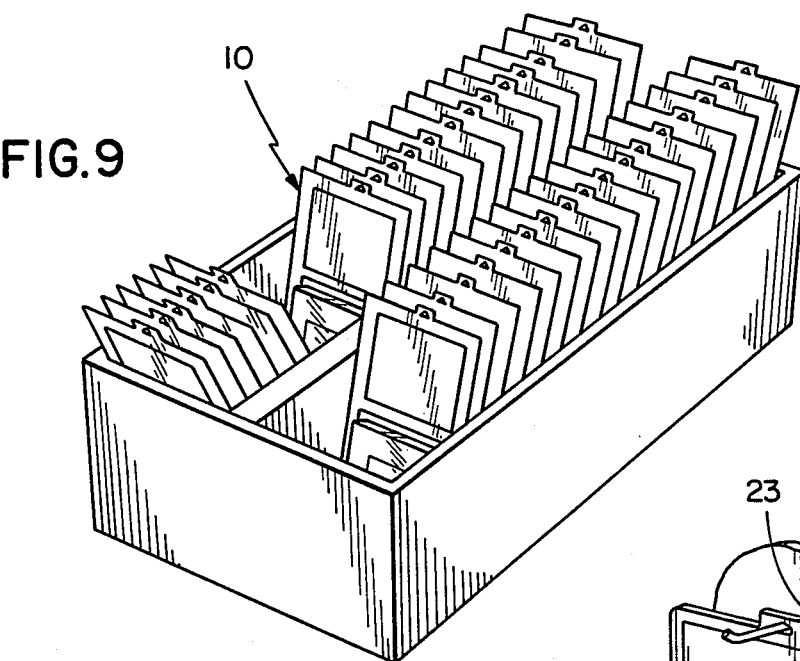
FIG. 9 is a display rack of the phono record type containing two rows of the present cassette display and storage holders.

As seen more clearly in FIGS. 1 and 2, back panel 11 has a graphics area 23 approximately 4⅞ in. ×4½ in. This area contains graphics relating to the pre-recorded audio tape 14 and may also contain textual product information. Panel 11 also has a cassette mounting area 24 defined by the outer periphery of blister cover 14.

Figure 11:
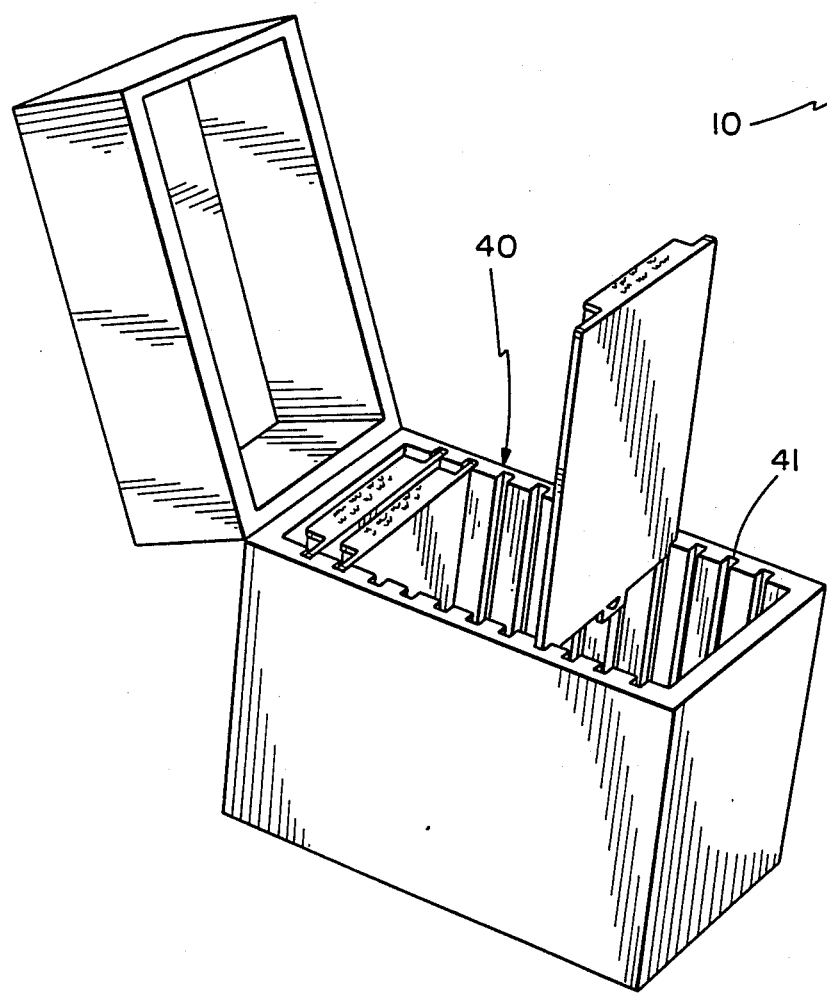

As seen more clearly in FIG. 11, the back panel 11 has elongated integral posts 26 and 27 projecting upwardly therefrom in the cassette holding area 14 that are positioned to fit in and engage in the standard reels 16 and 17 to assist in holding the cassette to the panel 11. Posts 26 and 27 are sized to provide a slight interference fit in the reels 16 and 17 to provide a firm locking action.

Supplementary integral side posts 29 and 30 are also provided on the back panel 11 that are spaced to have a slight interference fit with standard alignment flanges 32 on the sides of the tape 14 to assist in holding the cassette in position on panel 11.

The lower end of the panel 11 is provided with an elongated integral flange 34 that has a length of approximately 4 in. and a height off the surface of panel 11 of 15/32 in. The upper surface 35 of flange 34 completely covers the tape exposed area 18 of the tape 14 to prevent the entry of foreign matter into the tape and reels. As seen more clearly in FIG. 4, flange 34 has a lower surface 37 that carries indicia or textual information 38 relating to the specific tape so that when stored in a parallel storage device such as storage device 40, illustrated in FIG. 11, with parallel groove sets 41, the textual information 38 can be read by the consumer without separating the tapes from the storage container.

The blister pack is utilized for retail display only and is, of course, removed by the consumer after purchase. The back panel 11 and its associated projections then provide the user with a permanent storage device that can be utilized to store his or her cassettes in a multiple cassette storage device, such as storage device 40 illustrated in FIG. 11. The back panel 11 has unobstructed parallel side edges 48 and 49 separate from the graphics area 23 and the cassette area 24 so that they may slide in the slot sets 41 in the storage device illustrated in FIG. 11. The size of the back panel 11 minimizes the possibility of theft at the retail location and also provides easier handling for the user after purchase.

I claim:

1. A cassette tape display package and storage holder, comprising: a generally planar support having projections extending therefrom adapted to directly grip and hold a standard two reel unencased tape cassette, said planar support having a substantially planar non-foldable anti-theft extension extending away from the area the cassette is supported, said extension having an area at least as great as the standard cassette, indicia-graphics means applied to a major portion of the extension, said extension being nonfoldable after purchase so that it becomes a storage device the same size as it is as a display package, and means on the support for enclosing the reading area of the cassette tape without a Norelco type box, the planar support and planar extension being integral and coplanar.

2. A cassette tape package and storage holder, as defined in claim 1, wherein the cassette has a tape exposed area, an elongated integral projection extending outwardly from the planar support positioned to be directly adjacent and completely cover the exposed area on the cassette.

3. A cassette tape package and storage holder, as defined in claim 2, including indicia on the side of the elongated projection opposite the cassette to identify the cassette.

4. A cassette tape package and storage holder, as defined in claim 1, wherein the grip and hold projections include two spaced projections positioned to engage and grip the outside of the cassette.

5. A cassette tape package and storage holder, as defined in claim 1, wherein the grip and hold projections include the spaced projections positioned to enter and engage the cassette reels.

6. A cassette tape package and storage holder, as defined in claim 1, wherein the planar support has parallel thin straight outer edges parallel to its longitudinal axis so that the storage holder can be slid into a grooved multiple cassette storage container.

7. A standard tape cassette display and storage holder, comprising: a generally rectangular unfoldable planar support having a cassette support area and a larger graphics and anti-theft area spaced from the cassette support area, graphics applied to the graphics area, said planar support having projection-free parallel thin outer side edges so the holder can be slid into a parallel groove storage device, projection means on the support adapted to directly grip and hold a standard unencased tape cassette, an elongated outward integral projection on the one end of the planar support positioned to cover and protect an exposed tape area on the cassette, and identification indicia on the side of the elongated projection opposite the tape visible from the end of the planar support, said planar support anti-theft area being non-foldable after purchase so that the support becomes a storage holder the same size as a display.

8. A standard tape cassette display and storage holder, comprising: a generally rectangular non-foldable planar support having a cassette support area and a larger graphics and anti-theft area spaced from the cassette support area, graphics applied to the graphics area, said planar support having projection-free parallel thin outer side edges so the holder can be slid into a parallel groove storage device, projection means on the support adapted to directly grip and hold a standard unencased tape cassette, an elongated outward integral projection on the one end of the planar support positioned to cover and protect an exposed tape area on the cassette, identification indicia on the side of the elongated support opposite the tape visible from the end of the planar support, two spaced projections on the support positioned to engage and grip the outside of the cassette, and two spaced projections on the support positioned to enter and engage the cassette reels, said planar support anti-theft area being non-foldable after purchase so that the support becomes a storage holder the same size as a display.

* * * * *